United States Patent Office 3,191,956
Patented June 29, 1965

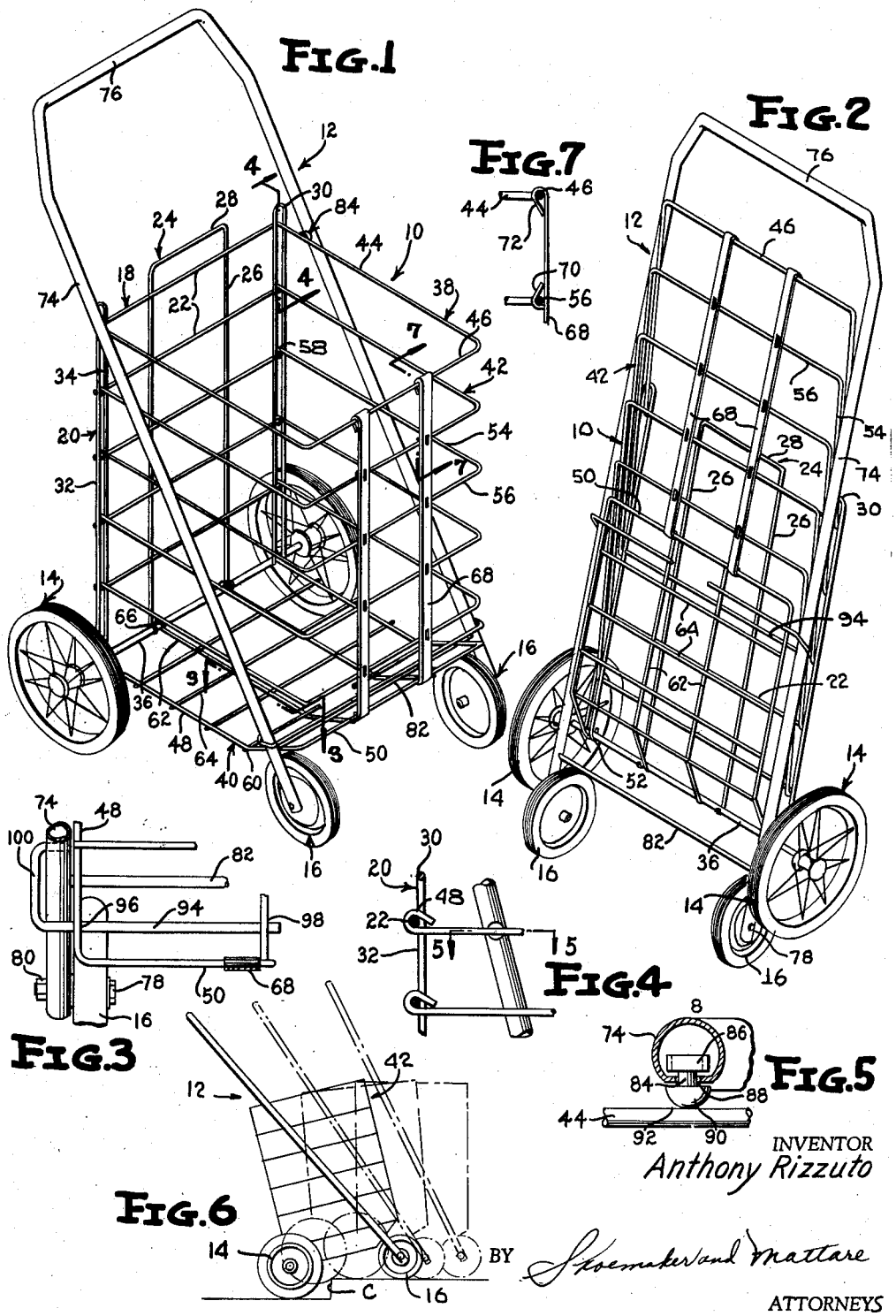

3,191,956
WHEELED SHOPPING CART OR BASKET
Anthony Rizzuto, 37—07 92nd St., Jackson Heights, N.Y.
Filed May 10, 1963, Ser. No. 279,530
7 Claims. (Cl. 280—36)

This invention relates to wheeled carriers and is directed particularly to improvements in wheeled carts or baskets designed for use in shopping or for similar purposes.

The use of wheeled carriers or baskets by housewives and others for transporting groceries or other articles of shopping from the store to the home is, of course, quite general. Such shopping carts or baskets, however, are usually of a two wheel type. Consequently, it is very tiring for a housewife or other shopper to manage such carts, particularly if they are well loaded, where it is necessary for the user to cross streets, thus involving the necessity of getting the cart up and down over curbing.

In using such two wheeled cart, when a curb is reached and must be crossed to move the cart into the street for crossing, it is customary to merely let the cart drop or bounce down the curb into the street or, if the cart is well filled, the user must exert a considerable amount of effort to ease it down the curb. Then, upon arriving at the opposite side of the street, the usual practice is for the person pulling the cart to turn so as to back up the curb and then pull the cart up over the curb and this also involves the expenditure of much energy, since practically the entire weight of the filled cart must be lifted.

In view of the foregoing it is a particular object of the present invention to provide a new, novel and improved type of shopping cart or basket, equipped with rearward and forward pairs of wheels and having the forward pair of wheels of relatively small size or diameter as compared to the rear wheels and having a control or manipulating handle so associated with the cart or basket and with the forward wheels, as to enable the user of the cart to easily move the same either up or down across a curbing or other obstruction with the very minimum expenditure of effort.

Another object of the invention is to provide a wheeled shopping cart which can be easily and quickly collapsed or folded into a flat unit and which, also, can be very quickly altered to an opened or unfolded condition, ready for use.

A still further object of the invention is to provide a foldable wheeled shopping cart or basket having a novel handle structure operatively coupled with the body of the basket and with the forward supporting wheels whereby it not only provides a steady or stable carrier for the front or forward wheels, but also braces and rigidifies the sides of the basket.

Still another object of the invention is to provide a foldable wheeled shopping cart or basket having the above stated novel features, wherein opposite side portions of the handle structure provide guide or track rails with which the forward lower part of the basket is slidably connected and on which portions of the basket or body of the structure slide or move in the folding and unfolding of the structure.

Many other objects and advantages of the present invention will become apparent as the description of the same proceeds and the invention will be best understood from a consideration of the following detailed description taken in connection with the accompanying drawings wherein:

FIG. 1 is a view in perspective of the improved wheeled shopping cart or basket of the present invention showing the same in open or unfolded condition for use.

FIG. 2 is a view in perspective of the shopping cart or basket in folded or collapsed condition.

FIG. 3 is a sectional detail, on an enlarged scale, taken substantially on the line 3—3 of FIG. 1.

FIG. 4 is a sectional detail taken substantially on the line 4—4 of FIG. 1, and on an enlarged scale.

FIG. 5 is a sectional detail, on a still larger scale, taken substantially on the line 5—5 of FIG. 4.

FIG. 6 is a skeletonized side elevational view of the cart or basket structure illustrating in solid lines in one position and in broken outline in additional successive positions the progression of the cart across a curb both in going off of the curb into the street and going from the street over the curb and onto a sidewalk.

FIG. 7 is a detail taken on the line 7—7 of FIG. 1.

Referring now more particularly to the drawings it will be seen that the improved shopping cart structure comprises a body which is generally designated 10 and which may be more specifically defined as a basket, a handlebar generally designated 12, a pair of rear supporting wheels, each of which is designated 14, and a pair of front or forward supporting wheels, each of which is designated 16.

The rear wheels 14 are of relatively large size while the front wheels 16 are considerably smaller, being here shown as of approximately half the diameter of the rear wheels, although it is to be understood that the structure is not confined to this size relationship between the front and rear wheels.

The body or basket 10, which is preferably constructed substantially entirely of a relatively heavy gauge wire, has a back which is generally designated 18 and this back of the basket comprises the corner posts or verticals 20, the horizontal cross connecting bars 22 which are vertically spaced and secured at their ends to the corner verticals.

Between the corner verticals is positioned the inverted U-shaped stiffening unit 24 which comprises the spaced parallel vertical legs 26, connected at their upper ends by the yoke portion 28 which lies above and parallel with the topmost cross bar 22 as illustrated. Also, as will be clearly seen in FIG. 1, the legs 26 of the unit 24 are approximately equidistantly spaced from the corner verticals.

The corner verticals or posts forming the side portions of the back of the basket are fashioned from a single length of the selected wire material, bent or folded intermediate its ends as indicated at 30, to form the relatively closely spaced parallel sections 32.

Thus it will be seen that each of the verticals, formed in the manner illustrated, provides or forms a slot 34 and the ends of the cross bars 22 extend across the slots of the corner posts and are welded to the corner posts.

The rear wheels 14 are mounted upon the ends of an axle 36, upon which they rotate.

The back 18 of the basket is positioned between the rear wheels 14 and the lower ends of the sections 32 of the corner verticals are welded or otherwise fixedly secured to the axle.

Also, the lower ends of the legs 26 of the stiffening unit 24 are fixedly secured, as by welding or the like, to the axle 36.

The sides and front of the basket structure form a rib cage which is pivotally attached to the back to permit the basket structure to be folded up into the flat condition shown in FIG. 2.

This foldable cage-like structure embodies the top and bottom substantially U-shaped ribs designated 38 and 40 respectively, and intermediate U-shaped ribs designated 42.

The U-shaped top rib portion of the basket comprises the spaced parallel side bars 44 and the cross connecting front bar 46. The side bars 44 have their rear ends lying in the slots of adjacent corner posts or verticals 20 and looped or otherwise suitably formed to provide hinge eyes 48 encircling the top cross bar 22.

The bottom rib 40 has the side rails 48 and the cross connecting front rail 50. These side rails 48 of the bottom rib are also looped or otherwise formed to provide pivot or hinge eyes 52 which encircle the axle 36 and lie between the lower ends of the sections 32 of the corner verticals or posts of the basket.

The intermediate ribs 42 are of the same form or configuration as the top rib 38, each intermediate rib having the side rails 54 and the cross connecting front rail 56 and the side rails 54 of the intermediate ribs are likewise looped or otherwise suitably formed to provide pivot or hinge eyes 58 which lie between the sections 32 in the slots formed thereby, and encircle a cross bar 22.

As illustrated in FIG. 1, the forward portions of the side rails 48 of the basket bottom rib are slightly bent upwardly as indicated at 60 so that the cross rail 50 is elevated slightly above the bottom of the basket.

The bottom of the basket is formed in the nature of an open grid, consisting of the front to rear wires 62 and the cross wires 64. The front to rear wires 62 and the cross wires are welded together where they cross over one another and the front to rear wires 62 are secured at their forward ends to the cross rail 50 of the bottom rib while the rear ends thereof are bent or otherwise formed to provide hinge eyes 66 which encircle the axle 36 to turn thereon.

The lateral ends of the cross wires 64 are secured by welding or the like to the side rails 48 of the bottom rib 40.

The cross rails 46, 50 and 56 of the vertically spaced U-shaped ribs which form the basket cage, are secured together by vertical connecting straps 68 which preferably comprise lengths of lightweight metal band or strip material. These connecting straps where they cross the cross rails 56 have coupling fingers 70 struck therefrom which loop around the adjacent cross rails, as illustrated in FIG. 7, while the top and bottom ends of the straps are looped over the cross rails 46 and 50 as indicated at 72, in FIG. 7. Thus, the straps are all pivotally attached to the rib sections of the basket so that the rib sections may all pivot at their rear ends on the parts of the basket back to which they are attached and thus be brought into a flat overlapping condition as illustrated in FIG. 2.

The handle structure 12 which is of elongate U-form is preferably fabricated from a single length of lightweight tubular material and comprises the long side bars 74 and the cross connecting hand grip bar 76.

The U-shaped handlebar 12 straddles the entire basket structure and, in the open and unfolded condition of the basket, the side bars extend from the top rear corner of the basket downwardly and forwardly across the bottom forward corner thereof, projecting at their lower ends beyond the basket bottom and having the small front wheels 16 rotatably mounted thereon as illustrated.

Preferably the mounting for the front wheels 16 comprises pivot pins 78 extending through the lower ends of the side bars 74 and having the wheels rotatably supported thereon upon the inner sides of the bars and maintained in position for rotation, by any suitable means as, for example, by a nut 80 threaded on the outer end of the pin 78 while the headed inner end of the pin engages the inner side of the wheel as illustrated in FIG. 3.

The lower ends of the side bars 76 are coupled together by the cross connecting bar or coupling bar 82 which is located in a plane just above the wheels 16.

Each side rail 44 of the top rib portion 38 is pivotally attached adjacent to its rear end, to the inner side of the adjacent handle side bar 74 as indicated at 84, to turn on a horizontal axis.

FIG. 5 illustrates in detail one form of pivot means for coupling the side rails of the top rib part 38 to their adjacent bars 74. This construction embodies a short headed stud 84 having on one end a transversely positioned lug 86 which is inserted into the side bar 74 through a suitable elongate slot 88 and then the stud is turned to position the lug crossways of the slot after which the head 90 of the lug is welded to the adjacent rail 44 as indicated at 92.

The forward part of the bottom of the basket structure is slidably coupled at each side with the adjacent side bar 74 of the handle. The coupling here illustrated comprises a short length of wire 94 secured across each side rail 48 and an adjacent front-to-rear bottom wire 62 and welded to these parts as indicated at 96 and 98. The wires 94 are extended outwardly beyond the adjacent rails 48 and bent to form a wide U-shaped arm 100 which extends around and across the outer side of the adjacent side bar 74, thus forming a loose sliding coupling with the bar 74.

From the foregoing description it will be seen that the shopping cart or basket of the present invention, when opened or unfolded as shown in FIG. 1, will be firmly supported upon the four wheels so that it can be conviently rolled along by a person grasping the bar 76. By reason of the fact that the forward wheels are relatively small as compared to the rear wheels, it will also be apparent, particularly with reference to FIG. 6, that when a curb C is approached, the cart, even if heavily loaded, can be readily tipped due to the fact that the lower ends of the side bars 74 are attached to the small front wheels. This makes it very easy to raise the front wheels by pressing downwardly upon the rear of the handlebar which, as shown in FIG. 1, extends a substanial distance upwardly and rearwardly of the back of the basket, so that the front wheels can be easily placed upon the paving beyond the curb. A forward pressure applied to the hand grip bar 76 will then result in the easy riding of the larger rear wheels 14 over the edge of the curb and onto the paving. Thus, the entire cart or basket can be elevated from the street level to the pavement level without a great amount of effort.

In the reverse operation of going down the curb it will be seen that the basket can be turned around so that the larger wheel will first roll off of the curb onto the lower street surface and the smaller front wheels will then smoothly ride down to the street surface without bumping or jarring the basket and without damaging either the basket or anything therein which might be of an easily breakable nature.

When the cart structure is not in use, the front rail 46 of the top rib part 38 can be grasped and lifted upwardly which action will result in pivoting all of the U-shaped rib members on the back of the basket, that is on the cross bars 22 and the axle 36, thereby folding the bottom of the basket and the overlying U-shaped parts 38 and 42 into overlapping, very nearly parallel relation one with the other and with the back structure 18 as illustrated in FIG. 2. Also as is illustrated in this figure, the rear wheels 14 will be elevated from the ground so that the basket as a whole may then be readily rolled along on the small front wheels 16.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A shopping cart comprising a receptacle body having a back and a construction joined to and lying forwardly of the back and including a bottom, a transverse rear axle forming a bottom part of said back, rear wheels on said axle, said back including transversely spaced members forming corner verticals of the receptacle, an elongate inverted substantially U-shaped handle having side bars and an upper end cross bar, said handle straddling the construction and extending at an inclination from the top part of said back downwardly and forwardly, means coupling the handle side bars to said construction at the top rear portion of the latter, other means coupling the handle side bars to said construction at the bottom forward part of the latter, and front wheels of materially smaller diameter than said rear wheels and operatively attached to said construction at the said bottom forward part thereof, the said construction comprising a plurality of vertically spaced substantially U-shaped individual, one piece ribs each having side rails and a cross connecting front rail, said side rails of said ribs being pivotally connected at their rear ends to said corner verticals of the back for vertical swinging, the bottom forming one of said ribs having an article supporting middle portion connected with the front and side rails thereof, the first said coupling means being pivotal and being between the handlebars and the side rails of the uppermost one of said ribs and the other said coupling means being a sliding means movable along the handlebars for facilitating pivotally swinging the U-shaped ribs relative to said corner verticals into a substantially flat folded overlapping relationship.

2. The invention according to claim 1, wherein the said attachment of said front wheels to said construction being by means of pivot members carried by the handle side bars and upon which pivot members said front wheels are rotatably mounted.

3. The invention according to claim 1, wherein the said attachment of said front wheels to said construction being by means of pivot members carried by the handle side bars and upon which pivot members said front wheels are rotatably mounted.

4. A shopping cart comprising a rear axle, rear supporting wheels thereon, a wire basket body having a back part including longitudinally slotted corner verticals and vertically spaced cross bars extending at their ends across the slots of said verticals and rigidly secured to the verticals, said basket body including top, bottom and intermediate, vertically spaced, substantially U-shaped ribs, said ribs each being in one piece and each comprising side rails and cross connecting front rails, said verticals having bottom ends rigidly secured to said axle, the rear ends of the side rails of said top and intermediate ribs lying in the slot of the adjacent vertical and hingedly coupled to a cross bar for vertical swinging, the side rails of the bottom rib being hingedly joined at their rear ends to said axle for vertical swinging, an elongate vertical connector extending across, between and hingedly attached to and coupling the front rails of said ribs, said bottom rib further including a grid-like middle part, an elongate, inverted substantially U-shaped handle embodying long side bars and a cross connecting top bar, the handle side bars extending across the outer sides of said U-shaped ribs, pivot connecting means between each handle side bar and the adjacent side rail of the uppermost rib in close proximity to the adjacent vertical, said pivot connecting means facilitating the relative turning of the handle and the basket body on a transversely extending axis, means rigidly secured to the said grid-like middle part and to each side rail of the bottom U-shaped rib adjacent to the cross connecting front rail of the latter connected to and forming a loose sliding coupling between the said bottom rib and said handle side bars, and front wheels of smaller diameter than said rear wheels supported on the lower ends of the side bars of the handle for rotation on a common transverse axis.

5. The invention according to claim 4, wherein the last said means consists of a wire member having an outer end portion bent to form a wide U-shaped arm passing around the adjacent handle bar on the outer side of the latter.

6. The invention according to claim 4, wherein the support for the said front wheels on the lower ends of the side bars consists of a pivot pin extending transversely through each side bar with the wheel supported for rotation thereon and upon the inner side of the side bar.

7. A shopping cart comprising a rear axle, rear supporting wheels thereon, a wire basket body having a back part including longitudinally slotted corner verticals and vertically spaced cross bars extending at their ends across the slots of said verticals and riigdly secured to the verticals, said basket body including top, bottom and intermediate, vertically spaced, substantially U-shaped rib members, said rib members each being in one piece and each comprising side rails and a cross connecting front rail, said verticals having bottom ends rigidly secured to said axle, the rear ends of the side rails of said top and intermediate rib members extending into the slot of the adjacent vertical and hingedly coupled to a cross bar for vertical swinging thereon, the side rails of the bottom rib member being hingedly joined at their rear ends to said axle for vertical swinging, an elongate vertical connector element extending across between and hingedly attached to the front rails of said rib members inwardly of the side rails of the latter, the said top and intermediate rib members forwardly of said verticals otherwise being free of connection one with the other, said bottom rib member further including a grid-like central portion, an elongate inverted substantially U-shaped handle embodying long side bars and a cross connecting top bars, the handle side bars extending across the outer sides of all of said U-shaped rib members, pivot connecting means between each side bar of the handle and the adjacent side rail of the uppermost rib member in close proximity to a corner vertical, said pivot connecting means facilitating the relative turning of the handle and the basket body on a transversely extending axis, bar means secured to and extending transversely of the bottom U-shaped rib members adjacent to the rear side of the cross connecting front rail thereof and having remote outer end portions extending beyond the adjacent side rails and across the forward sides of the adjacent side bars of the handles and reverted to form U-shaped arms loosely embracing the adjacent side bars of the handle and providing a loose sliding coupling between the handle side bars and the bottom rib member, and front wheels of smaller diameter than said rear wheels rotatably supported on said side bars of the handle upon the inner sides of said side bars and set inwardly with respect to the rear wheels and closer together than the rear wheels.

References Cited by the Examiner

UNITED STATES PATENTS

| | | | |
|---|---|---|---|
| 252,431 | 1/82 | Collingnon | 280—36 |
| 2,576,356 | 11/51 | Peterson | 280—36 |
| 2,590,048 | 3/52 | Sides | 280—36 X |
| 2,715,936 | 8/55 | Galloway | 280—36 X |
| 2,920,900 | 1/60 | Best | 280—36 |
| 3,074,734 | 1/63 | Munson et al. | 280—47.35 X |

ARTHUR L. LA POINT, *Primary Examiner.*